(12) United States Patent
Saito et al.

(10) Patent No.: US 11,048,068 B2
(45) Date of Patent: Jun. 29, 2021

(54) OPTICAL SYSTEM AND IMAGE CAPTURING APPARATUS INCLUDING THE SAME

(71) Applicant: CANON KABUSHIKI KAISHA, Tokyo (JP)

(72) Inventors: Shinichiro Saito, Utsunomiya (JP); Makoto Nakahara, Utsunomiya (JP); Suguru Inoue, Utsunomiya (JP); Akira Mizuma, Utsunomiya (JP); Masakazu Yamagishi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 16/194,095

(22) Filed: Nov. 16, 2018

(65) Prior Publication Data

US 2019/0162939 A1 May 30, 2019

(30) Foreign Application Priority Data

Nov. 30, 2017 (JP) .................. 2017-230830

(51) Int. Cl.
*G02B 13/02* (2006.01)
*G03B 5/00* (2006.01)
(Continued)

(52) U.S. Cl.
CPC .............. *G02B 13/02* (2013.01); *G02B 7/04* (2013.01); *G02B 7/08* (2013.01); *G02B 9/12* (2013.01); *G02B 27/646* (2013.01); *G03B 5/00* (2013.01)

(58) Field of Classification Search
CPC . G02B 7/04; G02B 7/08; G02B 7/102; G02B 7/10; G02B 7/023; G02B 7/09; G02B 7/02; G02B 27/646; G02B 7/021; G02B 7/025; G02B 13/001; G02B 7/003; G02B 7/026; G02B 15/14; G02B 7/005; G02B 7/022; G02B 5/005; G02B 7/105; G02B 7/12; G02B 7/14; G03B 3/10; G03B 17/04; G03B 2205/0053; G03B 17/12; G03B 13/36; G03B 17/14; G03B 5/00; G03B 2205/00; G03B 17/02; G03B 2205/0007; G03B 2205/0046; G03B 17/00;
(Continued)

(56) References Cited

U.S. PATENT DOCUMENTS

2013/0021513 A1* 1/2013 Eguchi .................... G02B 9/12 348/335
2017/0351059 A1* 12/2017 Gyoda .................... G02B 9/12
(Continued)

FOREIGN PATENT DOCUMENTS

JP  2015-215561 A  12/2015

*Primary Examiner* — William R Alexander
*Assistant Examiner* — Sharrief I Broome
(74) *Attorney, Agent, or Firm* — Canon U.S.A., Inc. IP Division

(57) ABSTRACT

An optical system is constituted of a first lens unit having a positive refractive power, a second lens unit having a positive refractive power and moving when focusing is performed, and a third lens unit which are arranged in this order from an object side to an image side, and distances between neighboring lens units are changed when focusing is performed. In the optical system, a back focus, arrangement of the second lens unit, and the like are appropriately set.

20 Claims, 7 Drawing Sheets

(51) Int. Cl.
*G02B 7/08* (2006.01)
*G02B 15/15* (2006.01)
*G02B 9/12* (2006.01)
*G02B 7/04* (2006.01)
*G02B 27/64* (2006.01)

(58) Field of Classification Search
CPC .............................. G03B 13/34; G03B 17/565; G03B 2217/002; G03B 9/06; G03B 13/32; G03B 2205/0023; G03B 2205/0069; G03B 2205/0084; H04N 5/2254; H04N 5/23212; H04N 5/2257; H04N 5/23296; H04N 5/2252; H04N 5/23209; H04N 5/238; H04N 13/239; H04N 13/296; H04N 5/08; H04N 5/2253; H04N 5/2258; H04N 5/23203; H04N 5/23216; H04N 5/23222; H04N 5/23238; H04N 5/23241; H04N 5/23245; H04N 5/23287; H04N 5/2351
See application file for complete search history.

(56) References Cited

U.S. PATENT DOCUMENTS

2018/0095242 A1\* 4/2018 Iwamoto .................. G02B 9/64
2020/0026047 A1\* 1/2020 Hosoi ..................... G02B 13/02

\* cited by examiner

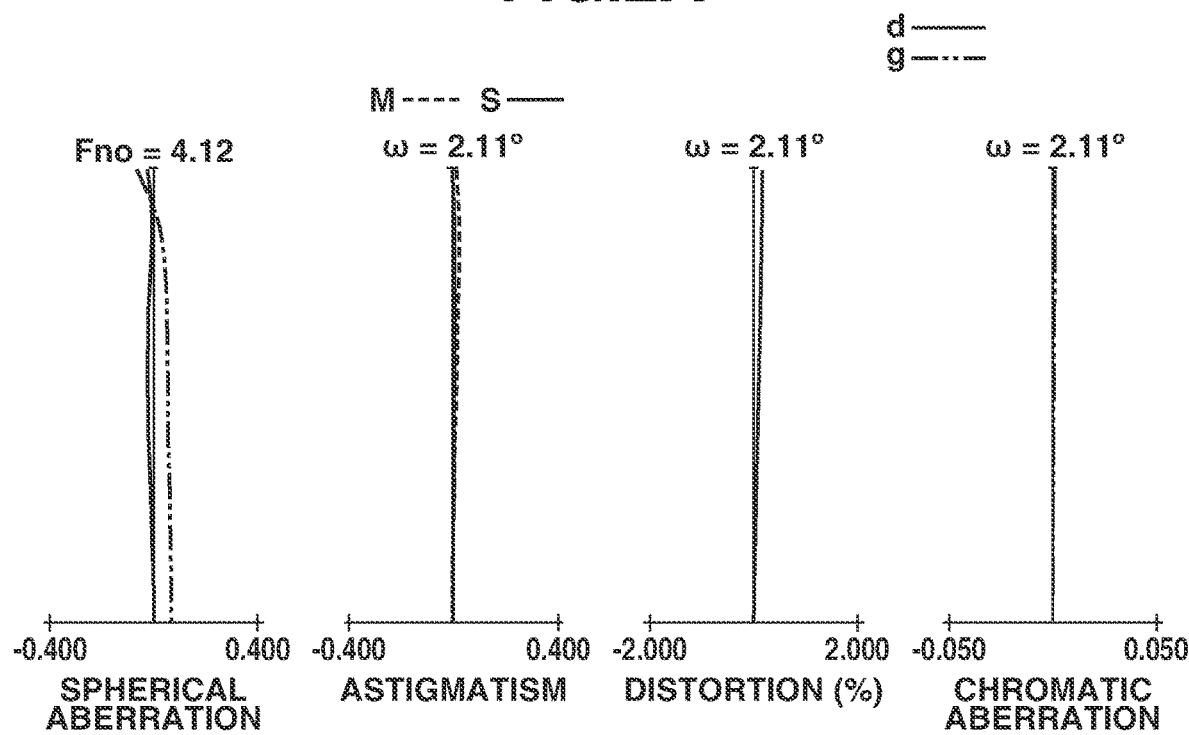
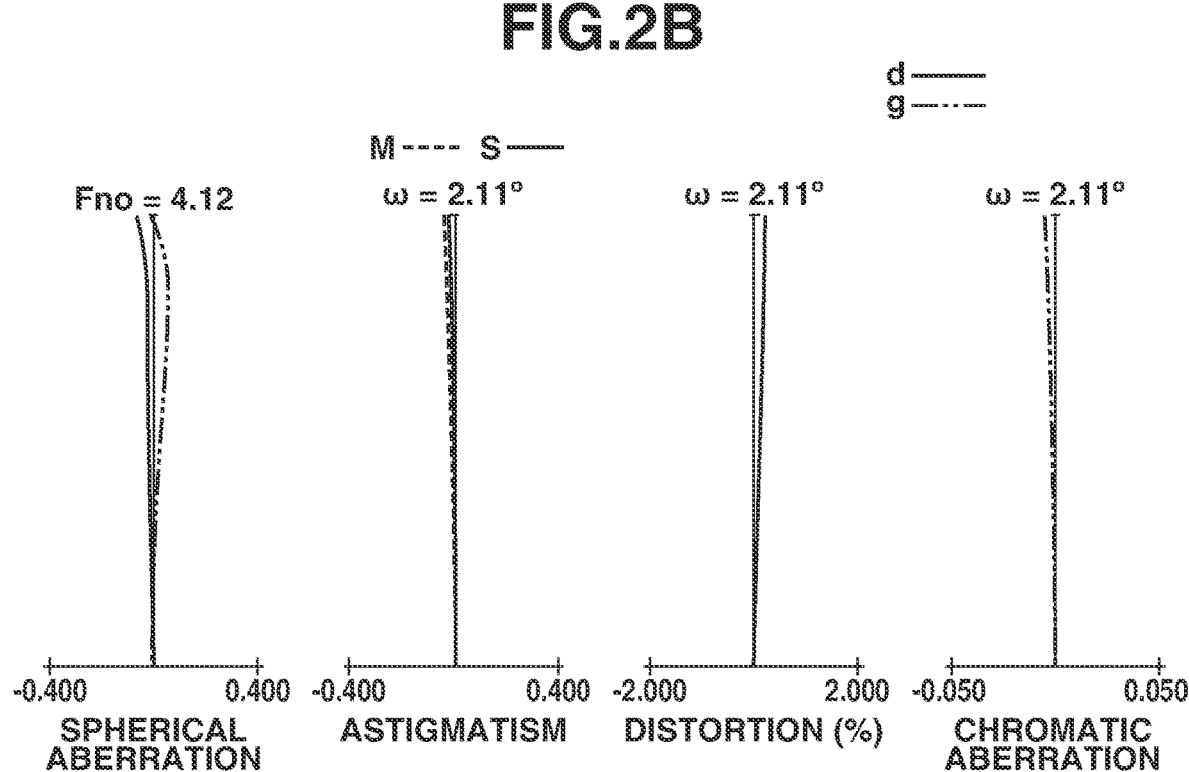

OPTICAL SYSTEM AND IMAGE CAPTURING APPARATUS INCLUDING THE SAME

BACKGROUND

Field of the Disclosure

The present disclosure relates to an optical system and an image capturing apparatus including the optical system suitable for an image capturing apparatus using an image pickup element, such as a digital still camera, a video camera, a monitoring camera, and a broadcasting camera, or an image capturing apparatus such as a camera using a silver-halide photographic film.

Description of the Related Art

As an image pickup optical system having a long focal length, a telephoto type image pickup optical system is known to include an optical system having a positive refractive power arranged at an object side, and an optical system having a negative refractive power arranged at an image side. The telephoto type image pickup optical system is used, for example, in a single focus super-telephoto lens.

Japanese Patent Application Laid-Open No. 2015-215561 describes an image pickup optical system constituted of a first lens unit having a positive refractive power, a second lens unit having a negative refractive power, and a third lens unit having a positive refractive power which are arranged from an object side to an image side in this order.

SUMMARY

An optical system includes a first lens unit having a positive refractive power, a second lens unit having a positive refractive power, and a third lens unit arranged in order from an object side to an image side and configured to move the second lens unit to change distances between neighboring lens units in a case where focusing is performed, wherein the first lens unit includes a positive lens G1 arranged closest to the object side, and wherein the following conditional expressions are satisfied, $LD/f < 1.00$, $0.15 < L/f < 0.48$, and $0.02 < BF/fG1 < 0.14$, where LD is a distance on an optical axis from a lens surface closest to the object side of the optical system to an image plane, L is a distance on the optical axis from a lens surface closest to the object side in the second lens unit when focusing on an object at infinity to the image plane, f is a focal length of the optical system, BF is a back focus of the optical system, and fG1 is a focal length of the positive lens G1.

Further features of the present invention will become apparent from the following description of exemplary embodiments with reference to the attached drawings.

BRIEF DESCRIPTION OF THE DRAWINGS

FIGS. 2A and 2B are aberration diagrams of the optical system according to the first exemplary embodiment.

DESCRIPTION OF THE EMBODIMENTS

Various exemplary embodiments of an optical system and an image capturing apparatus including the optical system according to the present invention will be described in detail below with reference to the attached drawings. An optical system in each exemplary embodiment is constituted of a first lens unit having a positive refractive power, a second lens unit having a positive refractive power, and a third lens unit which are arranged from an object side to an image side in this order. When focusing is performed, the second lens unit is moved, and distances between neighboring lens units are changed. A lens unit described here is lens elements which are relatively moved in an integrated manner when focusing is performed and may not include a plurality of lenses as long as one or more lenses are included.

Figure 1:
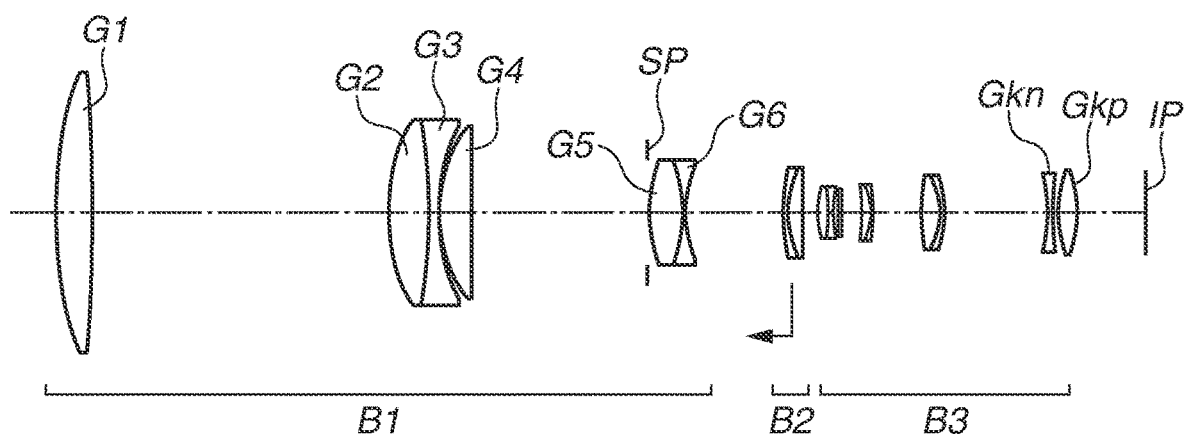
FIG. 1 is a cross-sectional view of lenses in an optical system according to a first exemplary embodiment.
Figure 3:
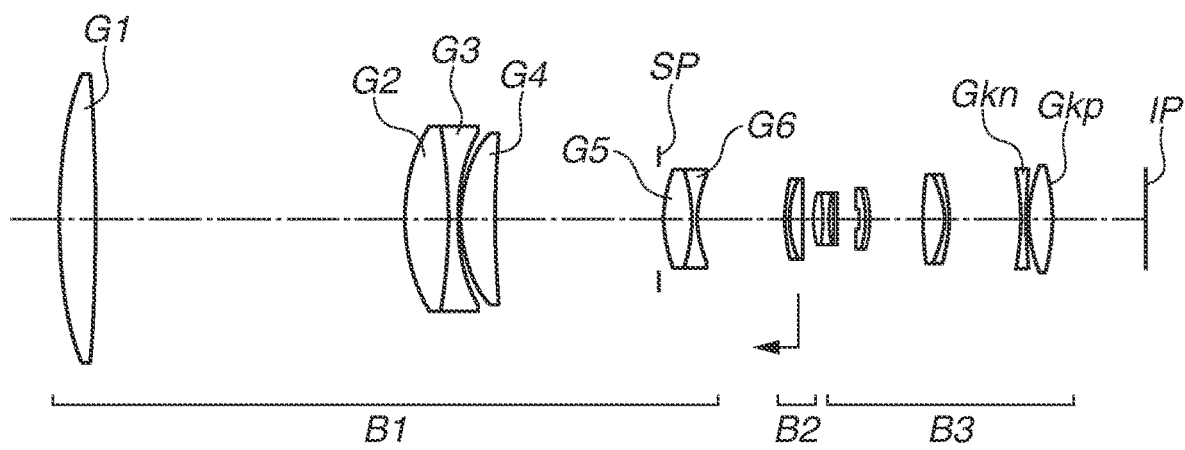
FIG. 3 is a cross-sectional view of lenses in an optical system according to a second exemplary embodiment.
Figure 5:
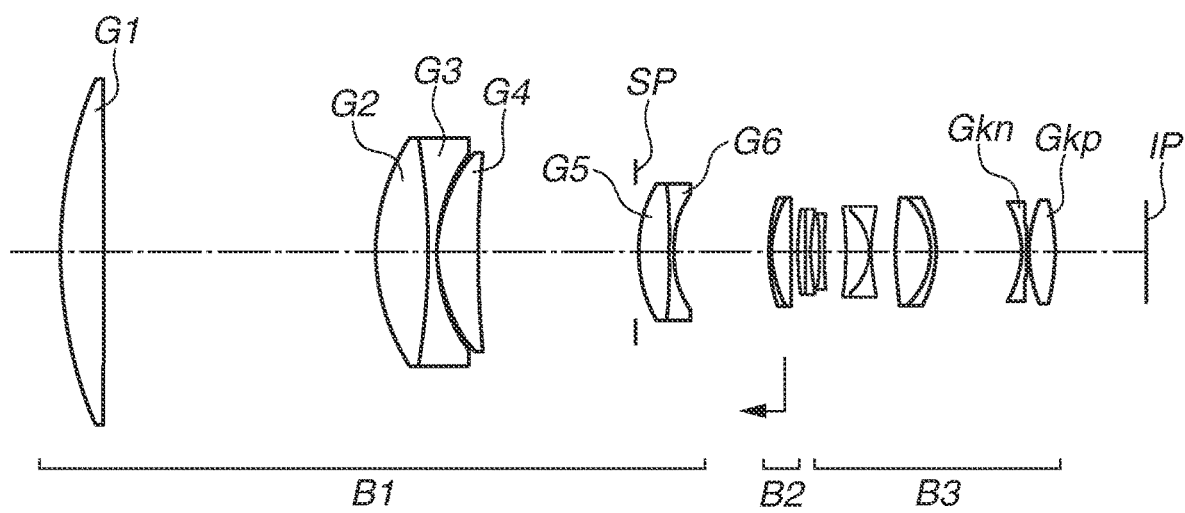
FIG. 5 is a cross-sectional view of lenses in an optical system according to a third exemplary embodiment.

FIGS. 1, 3, and 5 are cross-sectional views of lenses in the optical systems according to respective first to third exemplary embodiments.

The optical system according to each exemplary embodiment is an image pickup optical system used in an image capturing apparatus such as a video camera, a digital camera, a silver halide film camera, and a television camera. In the cross-sectional views of lenses, a left side is an object side (a front), and a right side is an image side (a rear). Further, in the cross-sectional views of lenses, an order of the lens units from the object side to the image side is indicated by "j", and "Bj" indicates a j-th lens unit.

In the optical system according to each exemplary embodiment, a first lens unit B1 includes a positive lens G1 which is arranged closest to the object side.

According to each exemplary embodiment, "SP" indicates an aperture stop. According to each exemplary embodiment, the aperture stop SP is arranged in the first lens unit B1.

"IP" indicates an image plane. When the optical system according to each exemplary embodiment is used as an image pickup optical system in a video camera and a digital camera, a solid-state image pickup element (a photoelectric conversion element) such as a charge coupled device (CCD) sensor and a complementary metal oxide semiconductor (CMOS) sensor is arranged on the image plane IP. When the optical system according to each exemplary embodiment is used as an image pickup optical system in a silver halide film camera, a film is arranged on the image plane IP.

Figure 4A:
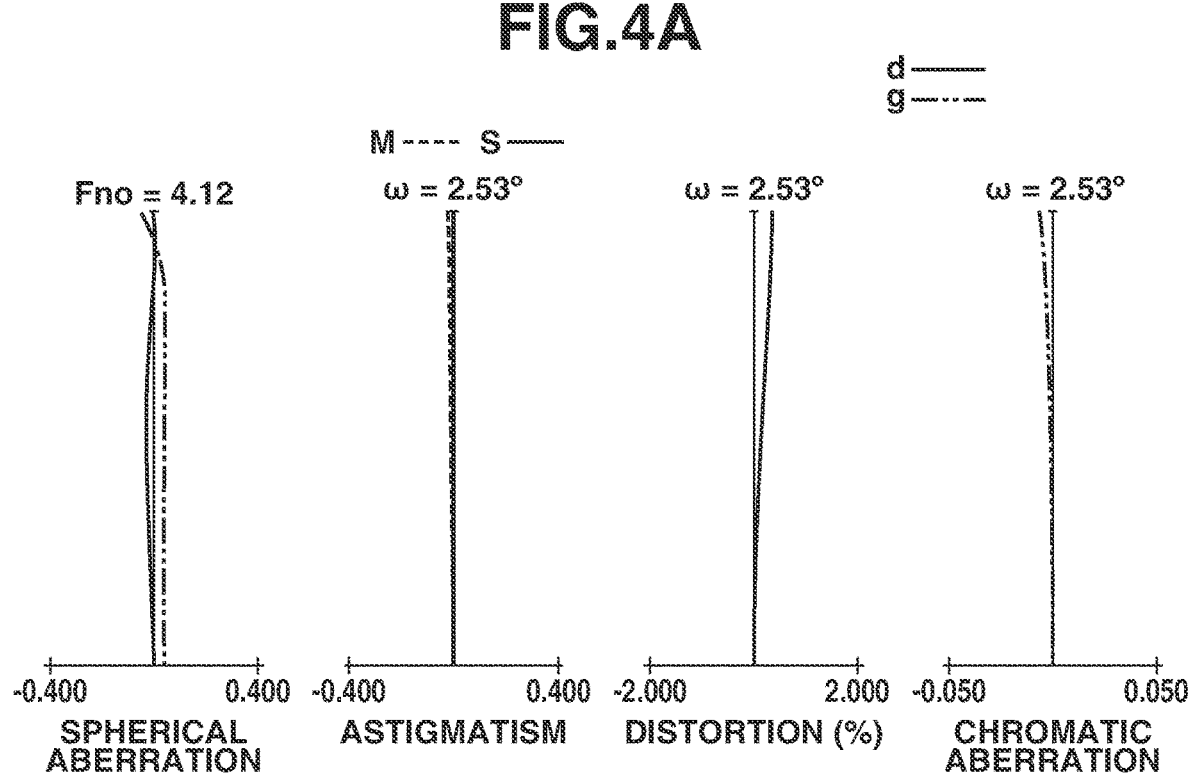
FIGS. 4A and 4B are aberration diagrams of the optical system according to the second exemplary embodiment.
Figure 4B:
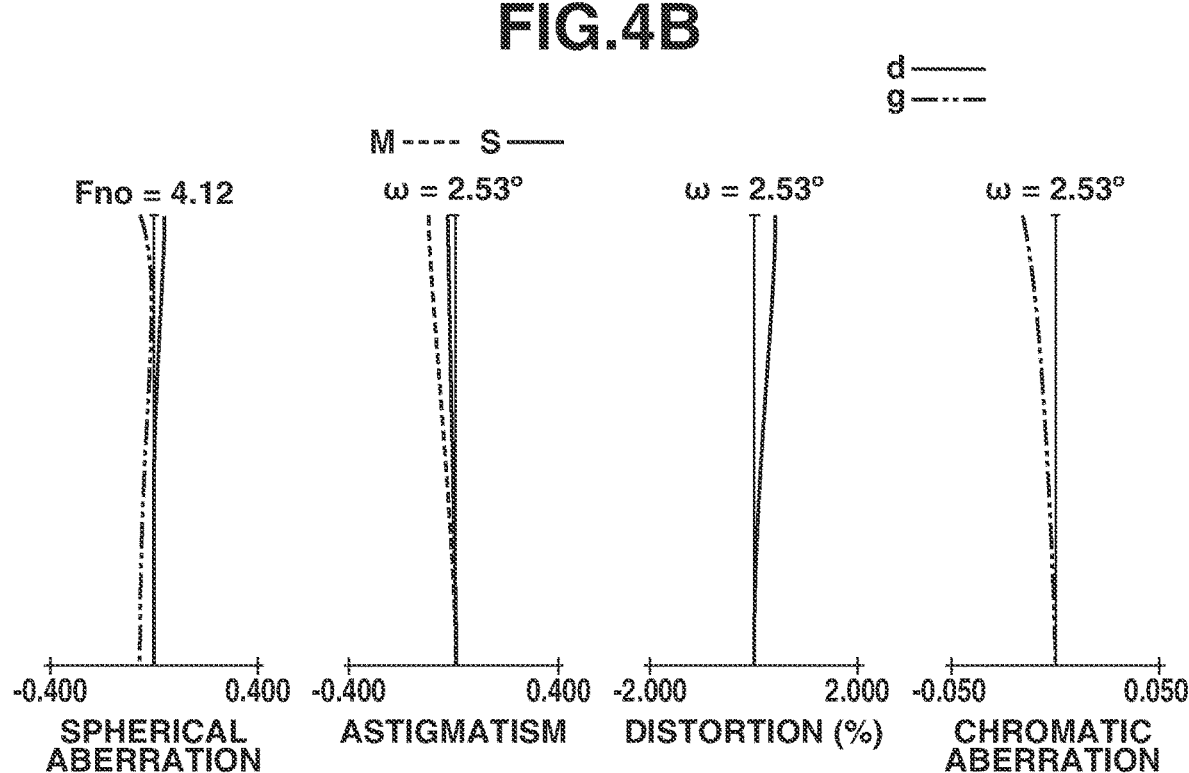
Figure 6A:
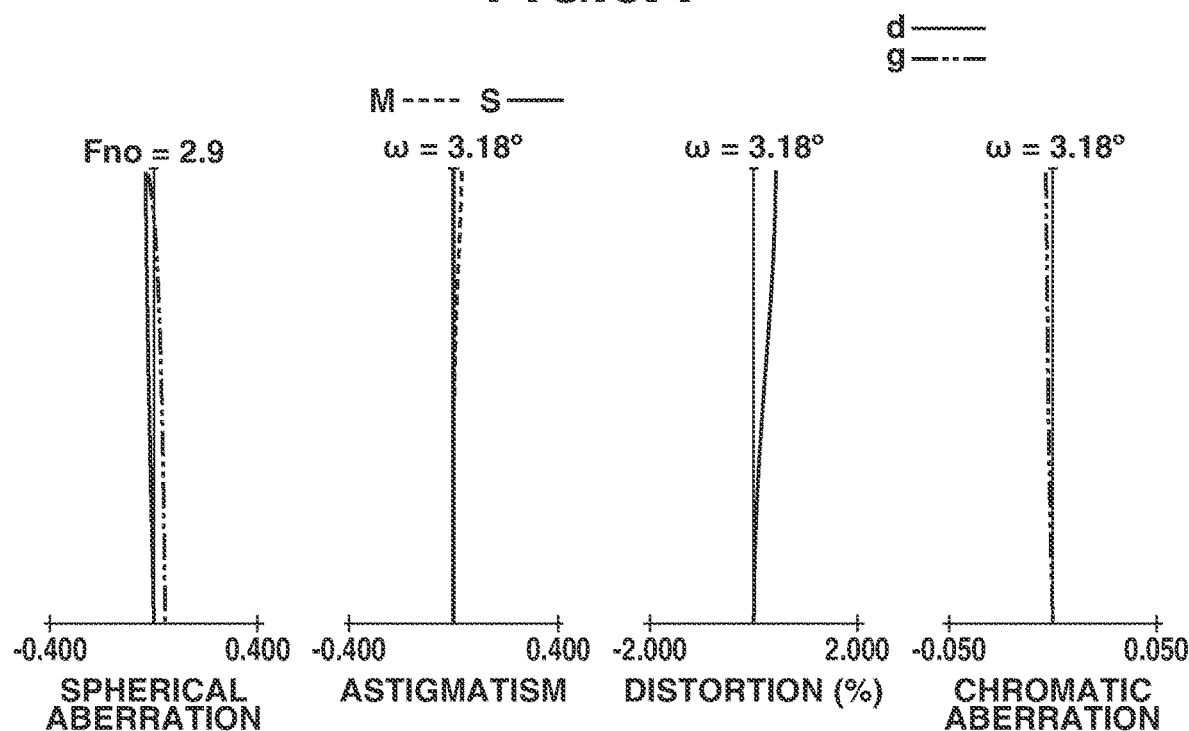
FIGS. 6A and 6B are aberration diagrams of the optical system according to the third exemplary embodiment.
Figure 6B:
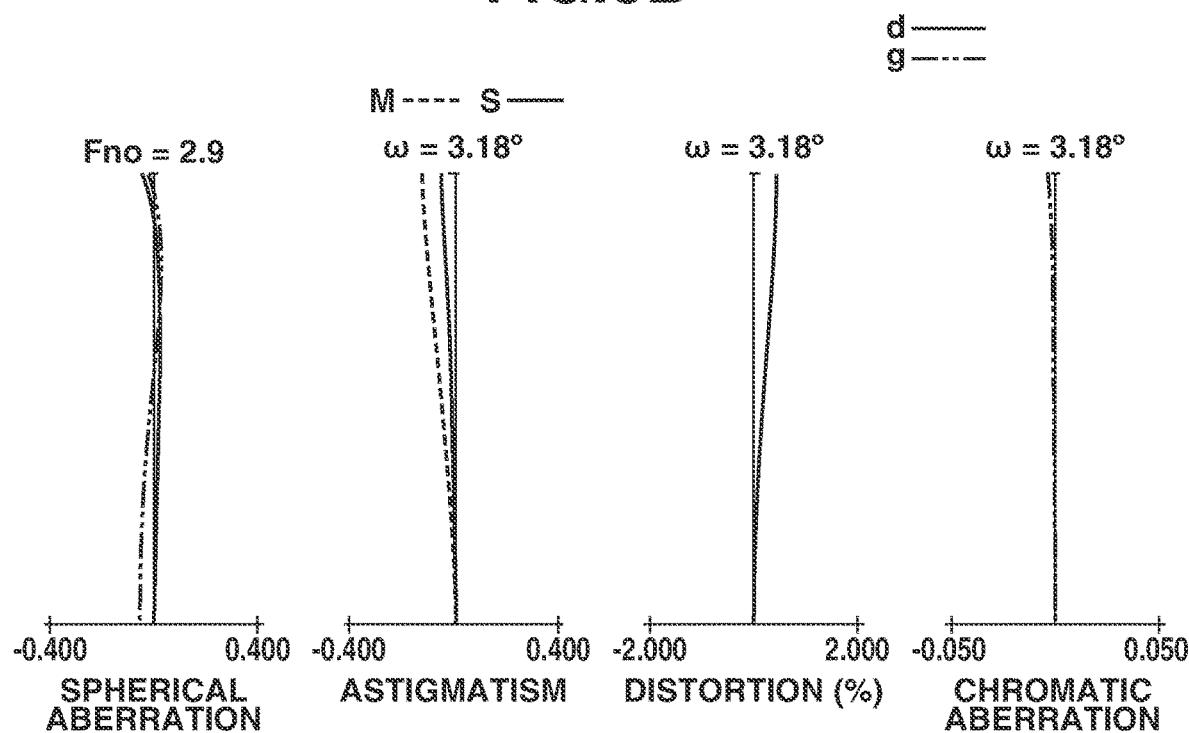

FIGS. 2A, 2B, 4A, 4B, 6A, and 6B are aberration diagrams of the optical systems according to the respective exemplary embodiments. FIGS. 2A, 4A, and 6A are the aberration diagrams when focusing on an object at infinity, and FIGS. 2B, 4B, and 6B are the aberration diagrams when focusing on an object at a shortest distance. In each spherical aberration diagram, an F-number Fno indicates spherical aberration with respect to a d-line (a wavelength of 587.6 nm) and a g-line (a wavelength of 435.8 nm). In each astigmatism diagram, "S" indicates an astigmatism amount of a sagittal image surface, and "M" indicates an astigmatism amount of a meridional image surface. Each distortion indicates with respect to the d-line. Each chromatic aberration diagram indicates chromatic aberration of the g-line. "ω" indicates an imaging half-field angle.

According to each exemplary embodiment, when focusing is performed from infinity to a short distance, a second lens unit B2 is moved to the object side as shown by an arrow in the cross-sectional view of the lenses, and distances between neighboring lens units are changed. In the optical system according to each exemplary embodiment, the second lens unit B2 corresponds to a focusing unit.

Further, in the optical system according to each exemplary embodiment, a part of the lenses in the optical system may be used as an image stabilizing unit, and a focus position may be changed by moving the image stabilizing unit to a direction with a component perpendicular to an optical axis. Accordingly, image blurring can be corrected. Any lens unit in the first lens unit B1, the second lens unit B2, and a third lens unit B3 may be used as the image stabilizing unit, or a part of the lenses included in a specific lens unit may be used as the image stabilizing unit.

The optical system according to each exemplary embodiment uses the second lens unit B2 arranged relatively close to the image side as the focusing unit and appropriately sets the arrangement of the second lens unit B2. Accordingly, each exemplary embodiment realizes downsizing and weight reduction of the focusing unit and reduces variations in chromatic aberration and spherical aberration at the time of focusing.

The lenses included in the first lens unit B1 arranged closest to the object side have large effective diameters since diameters of an on-axis light flux and an off-axis light flux are large. Thus, when the first lens unit B1 is used as the focusing unit, size and weight of the focusing unit may be increased.

On the other hand, the third lens unit B3 arranged closest to the image side has relatively small diameters of an on-axis light flux and an off-axis light flux, however, effective diameters of the lenses included in the third lens unit B3 are likely to be large since off-axis light passes through an area away from the optical axis. This event is particularly noticeable in an optical system having a short back focus.

Thus, from a viewpoint of downsizing and weight reduction of the focusing unit, it is desirable that the second lens unit B2 arranged between the first lens unit B1 and the third lens unit B3 is used as the focusing unit.

In addition, off-axis light and on-axis light pass through an area relatively close to the optical axis in the second lens unit B2, and thus variations in various types of aberration including chromatic aberration can be reduced at the time of focusing. In other words, it is desirable that the second lens unit B2 is used as the focusing unit so as to suppress aberration variations at the time of focusing.

An Abbe number νd is known as a parameter related to correction of chromatic aberration in the optical system. When refractive indices of a material to an F-line (486.1 nm), a C-line (656.3 nm), and a d-line (587.6 nm) are respectively denoted by NF, NC, and Nd, the Abbe number νd is expressed as follows:

$$\nu d = (Nd-1)/(NF-NC).$$

The optical system according to each exemplary embodiment satisfies the following conditional expressions:

$$LD/f < 1.00, \quad (1)$$

$$0.15 < L/f < 0.48, \quad (2)$$

$$0.02 < BF/fG1 < 0.14. \quad (3)$$

A focal length of the entire optical system is denoted by f, a distance (hereinbelow, referred to as an entire lens length) on the optical axis from a lens surface closest to the object side in the first lens unit B1 to the image plane is denoted by LD, and a distance on the optical axis from a lens surface closest to the object side in the second lens unit B2 to the image plane when focusing on an object at infinity is denoted by L. Further, a back focus of the optical system is denoted by BF, and a focal length of the positive lens G1 arranged closest to the object side in the first lens unit B1 is denoted by fG1.

The conditional expression (1) indicates that the entire lens length LD is shorter than the focal length f of the entire optical system. Generally, an optical system mounted on a telephoto lens of which an entire lens length is shortened has a focal length longer than the entire lens length LD. It is not desirable that the entire lens length LD is elongated to exceed an upper limit value of the conditional expression (1), since the optical system is enlarged in an optical axis direction. When the entire lens length LD is extremely shortened with respect to the focal length f of the entire optical system, it is difficult to sufficiently correct the aberration. Thus, as indicated in conditional expressions (1a) and (1b) described below, a lower limit value may be set in a range of values of LD/f.

The conditional expression (2) defines a ratio of the distance L on the optical axis from the lens surface closest to the object side in the second lens unit B2 to the image plane when focusing on an object at infinity with respect to the focal length f of the entire optical system. When the ratio is less than a lower limit value of the conditional expression (2), a distance between the second lens unit B2 as the focusing unit and the first lens unit B1 is too long. Thus, a height of an on-axis light flux entering the second lens unit B2 from the optical axis becomes low, however, a height of an off-axis light flux entering the second lens unit B2 from the optical axis easily becomes high. Accordingly, an effective diameter of the second lens unit B2 becomes large, and it is not desirable since weight of the optical system is increased.

When the ratio exceeds an upper limit value of the conditional expression (2), the distance between the second lens unit B2 as the focusing unit and the first lens unit B is too short. Accordingly, the heights of the off-axis light and the on-axis light entering the second lens unit B2 from the optical axis become high, and it is not desirable since variations in spherical aberration and on-axis chromatic aberration are increased at the time of focusing.

The conditional expression (3) defines a relationship between the back focus of the optical system and a focal length of the positive lens G1. When the conditional expression (3) is satisfied, a small optical system having a short entire length can be realized. When the value exceeds an upper limit value of the conditional expression (3), the back focus is too long, and it is not desirable since the optical system and the image capturing apparatus to which the optical system is mounted are enlarged in the optical axis direction. Further, when the value is less than a lower limit value of the conditional expression (3), the back focus is too short. In this case, a diameter of a lens arranged closest to the image side in the optical system becomes too large, and a diameter of a mount for mounting the optical system to the image capturing apparatus is increased. Accordingly, it is difficult to constitute the optical system and the image capturing apparatus in a small size and lightweight. When a diameter of a last lens in the optical system is reduced while reducing the back focus to be less than the lower limit value of the conditional expression (3), an incident angle of light to an image pickup element becomes large, and it is not desirable since an image quality is easily deteriorated especially in a periphery of an image.

According to each exemplary embodiment, each element in the optical system is appropriately set so as to satisfy the conditional expressions (1) to (3) as described above. Accordingly, a lightweight optical system in which aberration such as chromatic aberration is excellently corrected can be obtained.

According to each exemplary embodiment, it is desirable to set numerical value ranges of the conditional expressions (1) to (3) as follows:

$$0.75 < LD/f < 0.99, \quad (1a)$$

$$0.18 < L/f < 0.47, \quad (2a)$$

$$0.04 < BF/fG1 < 0.12. \quad (3a)$$

In addition, it is further desirable to set the numerical value ranges of the conditional expressions (1) to (3) as follows:

$$0.77 < LD/f < 0.96, \quad (1b)$$

$$0.20 < L/f < 0.45, \quad (2b)$$

$$0.06 < BF/fG1 < 0.10. \quad (3b)$$

Further, according to each exemplary embodiment, it is more desirable to satisfy one or more following conditional expressions:

$$0.10 < EA2/EA1 < 0.39, \quad (4)$$

$$0.50 < f1/f < 1.80, \quad (5)$$

$$0.15 < f2/f < 0.70, \quad (6)$$

$$0.20 < fG1/f < 5.00, \quad (7)$$

$$30.0 < vdG1, \quad (8)$$

$$0.05 < BF/IH < 2.20, \quad (9)$$

$$0.80 < |fGkp/fGkn| < 2.50, \quad (10)$$

$$0.17 < D12/LD < 0.40. \quad (11)$$

In the conditional expressions, "EA1" indicates an effective diameter of a lens surface closest to the object side in the first lens unit B1, "EA2" indicates an effective diameter of a lens surface closest to the object side in the second lens unit B2. "f1" indicates a focal length of the first lens unit B1, and "f2" indicates a focal length of the second lens unit B2. "vdG1" indicates an Abbe number of the positive lens G1. "IH" indicates a maximum image height. The maximum image height IH indicates a half of a diagonal length of a use range of an image pickup element used for forming an output image. "fGkp" indicates a focal length of a positive lens arranged closest to the image side in positive lenses included in the third lens unit B3, and "fGkn" indicates a focal length of a negative lens arranged closest to the image side in negative lenses included in the third lens unit B3. "D12" indicates a distance on the optical axis from a lens surface on the image side of the positive lens G1 arranged closest to the object side in the first lens unit B1 to a surface on the object side of a lens G2 arranged adjacent to the image side of the positive lens G1.

The conditional expression (4) defines a ratio of the effective diameter EA1 of the lens surface closest to the object side in the first lens unit B1 with respect to the effective diameter EA2 of the lens surface closest to the object side in the second lens unit B2. When the effective diameter EA1 is enlarged to be less than a lower limit value of the conditional expression (4), it is necessary to enhance a light convergence effect of the first lens unit B1 in order to constitute the optical system in a small size. Accordingly, the refractive power of the first lens unit B1 becomes too large, and it is not desirable since spherical aberration and on-axis chromatic aberration frequently occur in the first lens unit B1. Further, when the effective diameter EA2 is enlarged to exceed an upper limit value of the conditional expression (4), the second lens unit B2 as the focusing unit is enlarged, and it is not desirable since the weight of the optical system is increased.

The conditional expression (5) defines a ratio of the focal length f1 of the first lens unit B1 with respect to the focal length f of the entire optical system. When the conditional expression (5) is satisfied, the entire optical system can be constituted in a small size while maintaining a high optical performance. When the focal length f1 of the first lens unit B1 is shortened to be less than a lower limit value of the conditional expression (5), the refractive power of the first lens unit B1 becomes too large. Accordingly, it is not desirable since spherical aberration and on-axis chromatic aberration frequently occur in the first lens unit B1. Further, when the focal length f1 of the first lens unit B1 is elongated to exceed an upper limit value of the conditional expression (5), the refractive power of the first lens unit B1 becomes too small, and it is not desirable since the entire lens length is increased.

The conditional expression (6) defines a ratio of the focal length f2 of the second lens unit B2 with respect to the focal length f of the entire optical system. When the focal length f2 of the second lens unit B2 is shortened to be less than a lower limit value of the conditional expression (6), the refractive power of the second lens unit B2 as the focusing unit becomes too large. Accordingly, it is not desirable since it is difficult to sufficiently reduce variations in spherical aberration and on-axis chromatic aberration at the time of focusing. Further, when the focal length f2 of the second lens unit B2 is elongated to exceed an upper limit value of the conditional expression (6), the refractive power of the second lens unit B2 as the focusing unit becomes too small, and a moving amount of the second lens unit B2 is increased at the time of focusing. Accordingly, it is not desirable since it is difficult to constitute the optical system in a sufficiently small size.

The conditional expression (7) defines a ratio of the focal length fG1 of the positive lens G1 arranged closest to the object side in the lenses included in the first lens unit B1 with respect to the focal length f of the entire optical system. When the focal length fG1 of the positive lens G1 is shortened to be less than a lower limit value of the conditional expression (7), the refractive power of the positive lens G1 becomes too large. Accordingly, it is not desirable since spherical aberration frequently occurs in the positive lens G1. Further, when the focal length fG1 of the positive lens G1 is elongated to exceed an upper limit value of the conditional expression (7), the refractive power of the positive lens G1 becomes too small. Accordingly, the light convergence effect of the positive lens G1 is weakened, an effective diameter of a lens arranged closer to the image side than the positive lens G1 is enlarged, and it is not desirable since it is difficult to constitute the optical system in a sufficiently small size.

The conditional expression (8) defines the Abbe number vdG1 of the material of the positive lens G1. When the Abbe number vdG1 of the material of the positive lens G1 is lessened to be less than a lower limit value of the conditional expression (8), it is not desirable since on-axis chromatic aberration and chromatic aberration of magnification frequently occur in the positive lens G1.

The conditional expression (9) defines a relationship between the back focus BF of the optical system and the maximum image height IH. When a value of the relationship exceeds an upper limit value of the conditional expression (9), the entire length becomes too long, and weight of mechanical members (a lens barrel and the like) is increased, so that weight reduction of the optical system becomes difficult. Further, when the value is less than a lower limit value of the conditional expression (9), the back focus becomes too short. In this case, the diameter of the lens arranged closest to the image side in the optical system becomes too large, and the diameter of the mount for mounting the optical system to the image capturing apparatus is increased. Accordingly, it is difficult to constitute the optical system and the image capturing apparatus in a small size and lightweight. In addition, when the diameter of the last lens in the optical system is reduced while reducing the back focus to be less than the lower limit value of the conditional expression (9), the incident angle of light to the image pickup element becomes large, and it is not desirable since the image quality is easily deteriorated especially in a periphery of an image.

The conditional expression (10) defines a relationship of focal lengths of a positive lens Gkp arranged closest to the image side in the positive lenses and a negative lens Gkn arranged closest to the image side in the negative lenses of the third lens unit B3. When the conditional expression (10) is satisfied, the back focus of the optical system can be set to an appropriate length, and the entire length of the optical system can be reduced while excellently correcting distortion and chromatic aberration of magnification.

When the value exceeds an upper limit value of the conditional expression (10), it is favorable for reduction of the entire length of the optical system, however, it is not desirable since correction of distortion and chromatic aberration of magnification becomes insufficient.

When the value is less than a lower limit value of the conditional expression (10), it is not desirable since a curvature of field and distortion become large.

The conditional expression (11) defines a relationship between the distance D12 between the positive lens G1 and the lens G2 and the entire length LD of the optical system. When a value of the relationship exceeds an upper limit value of the conditional expression (11), it is favorable for weight reduction of the optical system, however, it is not desirable since it is difficult to sufficiently correct spherical aberration and chromatic aberration occurred in the positive lens G1 by lenses arranged on the image side of the positive lens G1. When the value is less than a lower limit value of the conditional expression (11), a diameter of a lens arranged on the image side than the positive lens G1 becomes too large, and it is not desirable since it is difficult to constitute the optical system in sufficient lightweight.

It is desirable to set numerical value ranges of the conditional expressions (4) to (10) as follows:

$$0.15 < EA2/EA1 < 0.38, \quad (4a)$$

$$0.60 < f1/f < 1.70, \quad (5a)$$

$$0.17 < f2/f < 0.65, \quad (6a)$$

$$0.30 < fG1/f < 2.50, \quad (7a)$$

$$32.0 < vdG1, \quad (8a)$$

$$0.90 < BF/IH < 2.00, \quad (9a)$$

$$0.82 < |fGkp/fGkn| < 2.30, \quad (10a)$$

$$0.20 < D12/LD < 0.35. \quad (11a)$$

It is further desirable to set the numerical value ranges of the conditional expressions (4) to (10) as follows:

$$0.27 < EA2/EA1 < 0.35, \quad (4b)$$

$$0.70 < f1/f < 1.60, \quad (5b)$$

$$0.20 < f2/f < 0.55, \quad (6b)$$

$$0.35 < fG1/f < 1.30, \quad (7b)$$

$$35.0 < vdG1, \quad (8b)$$

$$1.20 < BF/IH < 1.80, \quad (9b)$$

$$0.85 < |fGkp/fGkn| < 2.00, \quad (10b)$$

$$0.23 < D12/LD < 0.30. \quad (11b)$$

It is desirable that the second lens unit B2 which is moved when focusing is performed includes a relatively low dispersion positive lens and a relatively high dispersion negative lens. Accordingly, variations in chromatic aberration at the time of focusing, especially on-axis chromatic aberration can be suppressed.

Further, it is desirable that the second lens unit B2 is constituted of two or less lenses. Accordingly, weight reduction of the focusing unit can be attained, and further downsizing and weight reduction of a mechanism for driving the second lens unit B2 as the focusing unit can be realized.

Further, it is desirable that the first lens unit B1 is immovable when focusing is performed in the optical system according to each exemplary embodiment. The first lens unit B1 arranged closest to the object side in the lens units constituting the optical system has a larger effective diameter and heavy weight. Moving the first lens unit B1 having the heavy weight at the time of focusing requires a large driving mechanism, and it is not desirable since the weight of the optical system and the image capturing apparatus including the optical system is increased.

Further, it is desirable that the third lens unit B3 includes a positive lens and a negative lens in this order from the image plane side in the optical system according to each exemplary embodiment. In other words, it is desirable that the third lens unit B3 includes the positive lens Gkp arranged closest to the image side and the negative lens Gkn arranged adjacent to the object side of the positive lens Gkp. The configuration in which the negative lens and the positive lens are arranged in this order from the object side at the position closest to the image plane side of the optical system can decrease an incident angle to an image pickup plane. Accordingly, a decrease in light amount and deterioration in image quality in a peripheral part of an image which becomes an issue when a CMOS sensor and a CCD sensor are used as an image pickup element can be suppressed.

Further, it is desirable that the third lens unit B3 has a negative refractive power in the optical system according to each exemplary embodiment. Accordingly, a tendency of telephoto type power arrangement can be enhanced, and the entire length of the optical system can be further reduced.

Further, it is desirable that the first lens unit B1 is constituted of a small number of lenses so as to further reduce the weight of the optical system in the optical system according to each exemplary embodiment. In the optical system according to each exemplary embodiment, the first lens unit B1 is constituted of the positive lens G1, a positive lens G2, a negative lens G3, a positive lens G4, a positive lens G5, and a negative lens G6 arranged in this order from the object side to the image side so as to realize both of high optical performance and lightweight of the optical system. The above-described configuration is adopted, and thus the optical system can excellently correct spherical aberration and chromatic aberration while reducing diameters of the lenses included in the first lens unit B1. The first lens unit B1 may include a lens other than the above-described positive lens G1 to the lens G6.

Next, first to third numerical examples corresponding to the first to the third exemplary embodiments are described. According to each numerical example, "i" indicates an order of optical surfaces from the object side. "ri" indicates a curvature radius of an i-th optical surface (an i-th surface), "di" indicates a distance between the i-th surface and an (i+1)-th surface, and "ndi" and "vdi" respectively indicate a refractive index and an Abbe number of a material of an i-th optical member with respect to a d-line. Regarding a change in distance between the lens surfaces, a distance between the lens surfaces when focusing on an object at infinity and a distance between the lens surfaces when focusing on an object at a shortest distance are described.

According to each exemplary embodiment, the back focus (BF) indicates a distance from a surface closest to the image side of the optical system to an image plane by an air conversion length.

In each exemplary embodiment, a protective glass for protecting a lens may be arranged on the object side of the first lens unit B1. In addition, a protective glass and a low-pass filter may be arranged between a lens arranged closest to the image plane side and the image plane. In this specification, an optical member having an extremely small refractive power such as a protective glass and a low-pass filter arranged closest to the object side of the optical system is not regarded as a lens constituting the optical system. In this regard, "extremely small refractive power" means an optical member of which an absolute value of a focal length is five or more times than the focal length of the entire optical system.

When an optical member having an extremely small refractive power is arranged between the optical system and an image pickup element, air converted values of the optical member having the extremely small refractive power arranged between the optical system and the image pickup element are used as the values of the above-described parameters BF, L, and LD.

First Numerical Example

Surface Data

| Surface Number | r | d | nd | vd | Effective Diameter |
|---|---|---|---|---|---|
| 1 | 273.587 | 14.64 | 1.53172 | 48.8 | 142.72 |
| 2 | −1485.165 | 128.46 | | | 142.07 |
| 3 | 117.735 | 17.18 | 1.43700 | 95.1 | 94.43 |
| 4 | −340.216 | 3.80 | 1.73800 | 32.3 | 92.37 |
| 5 | 113.761 | 0.50 | | | 86.85 |
| 6 | 87.350 | 13.20 | 1.43387 | 95.1 | 86.79 |
| 7 | 556.638 | 76.31 | | | 85.64 |
| 8 (Stop) | ∞ | 1.50 | | | 53.23 |
| 9 | 81.222 | 13.94 | 1.80810 | 22.8 | 51.26 |
| 10 | −94.963 | 1.50 | 1.90315 | 29.8 | 47.99 |

-continued

| | | | | | |
|---|---|---|---|---|---|
| 11 | 67.020 | (variable) | | | 44.38 |
| 12 | 131.816 | 1.99 | 1.80810 | 22.8 | 44.21 |
| 13 | 55.592 | 5.71 | 1.90366 | 31.3 | 43.05 |
| 14 | 250.974 | (variable) | | | 42.39 |
| 15 | 69.133 | 4.58 | 1.85478 | 24.8 | 26.10 |
| 16 | −102.654 | 1.62 | 1.76385 | 48.5 | 25.04 |
| 17 | 43.635 | 2.75 | | | 23.25 |
| 18 | −106.232 | 1.57 | 1.91082 | 35.3 | 23.05 |
| 19 | 154.026 | 8.63 | | | 23.26 |
| 20 | −98.673 | 3.72 | 1.51633 | 64.1 | 26.50 |
| 21 | −35.168 | 1.70 | 1.59282 | 68.6 | 27.22 |
| 22 | −74.809 | 20.26 | | | 28.47 |
| 23 | 168.218 | 7.73 | 1.73800 | 32.3 | 37.90 |
| 24 | −49.665 | 1.90 | 1.92286 | 18.9 | 38.28 |
| 25 | −94.113 | 45.01 | | | 39.03 |
| 26 | −91.270 | 2.00 | 1.85025 | 30.1 | 38.96 |
| 27 | 188.331 | 2.15 | | | 39.99 |
| 28 | 79.827 | 8.02 | 1.51742 | 52.4 | 42.25 |
| 29 | −95.869 | 30.00 | | | 42.71 |
| 30 (Image Plane) | ∞ | | | | |

Various Data Pieces

| | | |
|---|---|---|
| Focal Length | 588.00 | |
| F-number | 4.12 | |
| Field Angle | 2.11 | |
| Image Height | 21.64 | |
| Entire Lens Length | 470.01 | |
| BF | 30.00 | |
| Focusing Magnification | 0.00 | −0.125 |
| d11 | 41.89 | 6.53 |
| d14 | 7.77 | 43.13 |
| Entrance Pupil Position | 612.47 | |
| Exit Pupil Position | −262.22 | |
| Front Principal Point Position | 17.32 | |
| Rear Principal Point Position | −558.00 | |

Lens Unit Data

| Unit | Start Surface | Focal Length | Lens Structure Length | Front Principal Point Position | Rear Principal Point Position |
|---|---|---|---|---|---|
| 1 | 1 | 492.40 | 271.02 | −402.75 | −340.34 |
| 2 | 12 | 230.08 | 7.70 | −2.96 | −6.96 |
| 3 | 15 | −508.16 | 111.63 | −161.78 | −367.02 |

Second Numerical Example

Surface Data

| Surface Number | r | d | nd | vd | Effective Diameter |
|---|---|---|---|---|---|
| 1 | 243.219 | 12.51 | 1.53172 | 48.8 | 118.92 |
| 2 | −1049.721 | 109.98 | | | 118.32 |
| 3 | 99.100 | 15.28 | 1.43700 | 95.1 | 78.72 |
| 4 | −241.398 | 3.17 | 1.73800 | 32.3 | 76.74 |
| 5 | 102.594 | 0.42 | | | 72.41 |
| 6 | 70.724 | 12.37 | 1.4387 | 95.1 | 72.26 |
| 7 | 663.365 | 57.94 | | | 70.99 |
| 8 (Stop) | ∞ | 1.25 | | | 42.84 |
| 9 | 61.227 | 10.52 | 1.80810 | 22.8 | 40.52 |
| 10 | −71.520 | 1.25 | 1.90315 | 29.8 | 37.88 |
| 11 | 50.034 | (variable) | | | 34.32 |
| 12 | 96.155 | 1.50 | 1.80810 | 22.8 | 32.39 |
| 13 | 46.612 | 4.20 | 1.90366 | 31.3 | 31.57 |
| 14 | 153.371 | (variable) | | | 30.89 |
| 15 | 63.80 | 3.37 | 1.85478 | 24.8 | 20.65 |
| 16 | −91.132 | 1.35 | 1.76383 | 48.5 | 20.42 |
| 17 | 37.323 | 2.47 | | | 19.96 |
| 18 | −80.264 | 1.31 | 1.91082 | 35.3 | 20.24 |
| 19 | 142.995 | 7.04 | | | 20.54 |
| 20 | −312.849 | 2.82 | 1.54814 | 45.8 | 24.15 |

-continued

| | | | | | |
|---|---|---|---|---|---|
| 21 | −59.754 | 1.42 | 1.76385 | 48.5 | 24.82 |
| 22 | −97.631 | 18.93 | | | 25.55 |
| 23 | 278.787 | 7.61 | 1.73800 | 32.3 | 35.45 |
| 24 | −41.117 | 1.59 | 1.92286 | 18.9 | 36.07 |
| 25 | −81.170 | 25.11 | | | 37.11 |
| 26 | −111.040 | 1.67 | 1.67790 | 55.3 | 40.23 |
| 27 | 154.188 | 0.83 | | | 41.32 |
| 28 | 64.534 | 8.37 | 1.51823 | 58.9 | 43.16 |
| 29 | −132.437 | 32.61 | | | 43.47 |
| 30 (Image Plane) | ∞ | | | | |

Various Data Pieces

| | | |
|---|---|---|
| Focal Length | 489.95 | |
| F-number | 4.12 | |
| Field Angle | 2.53 | |
| Image Height | 21.64 | |
| Entire Lens Length | 382.69 | |
| BF | 32.61 | |
| Focusing Magnification | 0.00 | −0.102 |
| d11 | 31.40 | 5.48 |
| d14 | 4.39 | 30.31 |
| Entrance Pupil Position | 507.79 | |
| Exit Pupil Position | −271.05 | |
| Front Principal Point Position | 207.20 | |
| Rear Principal Point Position | −457.34 | |

Lens Unit Data

| Unit | Start Surface | Focal Length | Lens Structure Length | Front Principal Point Position | Rear Principal Point Position |
|---|---|---|---|---|---|
| 1 | 1 | 337.96 | 224.69 | −276.26 | −252.50 |
| 2 | 12 | 211.65 | 5.70 | −3.42 | −6.35 |
| 3 | 15 | −1399.88 | 83.91 | −605.23 | −1185.00 |

Third Numerical Example

Surface Data

| Surface Number | r | d | nd | vd | Effective Diameter |
|---|---|---|---|---|---|
| 1 | 219.712 | 14.09 | 1.69680 | 56.5 | 134.48 |
| 2 | −22250.462 | 90.03 | | | 133.58 |
| 3 | 97.765 | 17.06 | 1.43700 | 95.1 | 87.89 |
| 4 | −358.054 | 3.17 | 1.73800 | 32.3 | 85.38 |
| 5 | 78.272 | 0.50 | | | 78.08 |
| 6 | 72.132 | 13.13 | 1.43387 | 95.1 | 78.13 |
| 7 | 447.067 | 52.45 | | | 76.96 |
| 8 (Stop) | ∞ | 1.25 | | | 55.00 |
| 9 | 68.523 | 9.59 | 2.00272 | 19.3 | 52.66 |
| 10 | −1500.656 | 1.50 | 2.00069 | 25.5 | 50.23 |
| 11 | 53.294 | (variable) | | | 46.12 |
| 12 | 65.142 | 1.50 | 2.00272 | 19.3 | 42.35 |
| 13 | 53.418 | 5.96 | 1.65844 | 50.9 | 41.36 |
| 14 | 472.766 | (variable) | | | 40.50 |
| 15 | 201.708 | 2.83 | 2.00272 | 19.3 | 31.85 |
| 16 | −495.946 | 1.35 | 1.77250 | 49.6 | 31.09 |
| 17 | 68.571 | 2.97 | | | 29.64 |
| 18 | −122.374 | 1.31 | 1.53775 | 74.7 | 29.43 |
| 19 | 177.165 | 7.40 | | | 28.86 |
| 20 | −284.467 | 7.64 | 1.54072 | 47.2 | 30.72 |
| 21 | −24.365 | 1.42 | 1.67000 | 57.3 | 31.26 |
| 22 | 133.379 | 7.27 | | | 33.96 |
| 23 | 135.474 | 12.39 | 1.85026 | 32.3 | 39.94 |
| 24 | −30.486 | 1.55 | 2.00272 | 19.3 | 40.72 |
| 25 | −48.631 | 27.91 | | | 42.32 |
| 26 | −40.218 | 1.67 | 2.00069 | 25.5 | 35.24 |
| 27 | −510.475 | 0.80 | | | 37.18 |
| 28 | 66.206 | 8.64 | 1.51633 | 64.1 | 40.00 |
| 29 | −107.458 | 30.61 | | | 40.66 |
| 30 (Image Plane) | ∞ | | | | |

Various Data Pieces

| | | |
|---|---|---|
| Focal Length | 390.00 | |
| F-number | 2.90 | |
| Field Angle | 3.18 | |
| Image Height | 21.64 | |
| Entire Lens Length | 360.00 | |
| BF | 30.61 | |
| Focusing Magnification | 0.00 | −0.172 |
| d11 | 31.49 | 5.51 |
| d14 | 2.50 | 28.48 |
| Entrance Pupil Position | 435.81 | |
| Exit Pupil Position | −105.99 | |
| Front Principal Point Position | −287.65 | |
| Rear Principal Point Position | −359.39 | |

Lens Unit Data

| Unit | Start Surface | Focal Length | Lens Structure Length | Front Principal Point Position | Rear Principal Point Position |
|---|---|---|---|---|---|
| 1 | 1 | 410.04 | 202.78 | −285.73 | −267.50 |
| 2 | 12 | 130.03 | 7.46 | −1.42 | −5.72 |
| 3 | 15 | −126.99 | 85.15 | −3.31 | −67.65 |

Various numerical values of each of the exemplary embodiments are indicated in the following Table 1.

TABLE 1

| | First Exemplary Embodiment | Second Exemplary Embodiment | Third Exemplary Embodiment |
|---|---|---|---|
| Conditional Expression (1) | 0.799 | 0.781 | 0.923 |
| Conditional Expression (2) | 0.267 | 0.258 | 0.322 |
| Conditional Expression (3) | 0.069 | 0.088 | 0.098 |
| Conditional Expression (4) | 0.310 | 0.272 | 0.315 |
| Conditional Expression (5) | 0.837 | 0.731 | 1.051 |
| Conditional Expression (6) | 0.391 | 0.432 | 0.333 |
| Conditional Expression (7) | 0.741 | 0.761 | 0.801 |
| Conditional Expression (8) | 48.84 | 48.84 | 56.47 |
| Conditional Expression (9) | 1.386 | 1.507 | 1.415 |

TABLE 1-continued

| | First Exemplary Embodiment | Second Exemplary Embodiment | Third Exemplary Embodiment |
|---|---|---|---|
| Conditional Expression (10) | 1.187 | 0.894 | 1.847 |
| Conditional Expression (11) | 0.273 | 0.287 | 0.251 |

[Image Capturing Apparatus]

Figure 7:
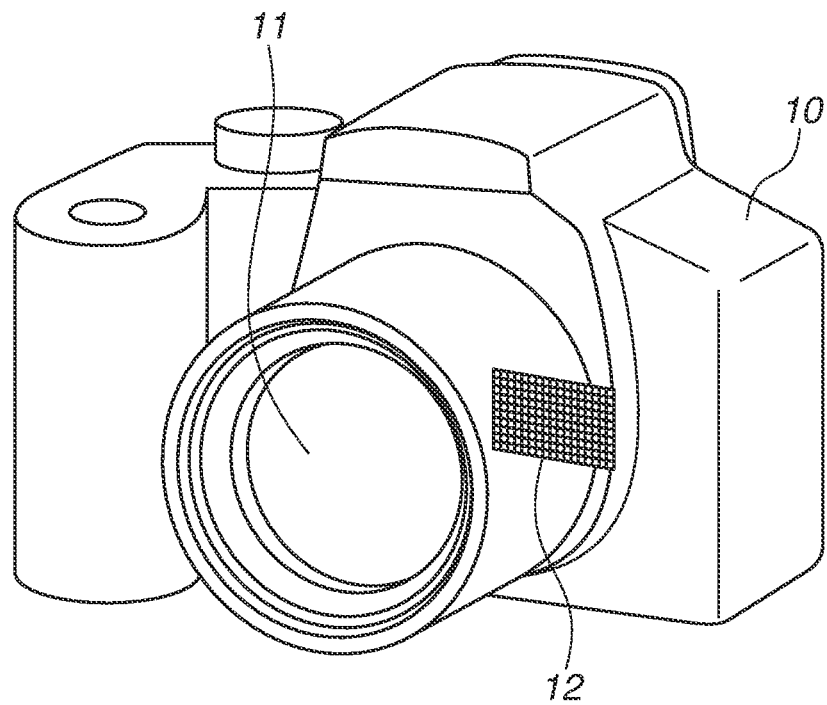
FIG. 7 is a schematic drawing of an image capturing apparatus.

Next, an exemplary embodiment of a digital still camera (an image capturing apparatus) which uses an optical system according to the present invention as an image pickup optical system is described with reference to FIG. 7. FIG. 7 illustrates a camera body 10 and an image pickup optical system 11 constituted of any of the optical system described according to the first to the third exemplary embodiments. A solid-state image pickup element (a photoelectric conversion element) 12 such as a CCD sensor and a CMOS sensor which receives a light of an object image formed by the image pickup optical system 11 is built in the camera body 10.

The optical system according to the present invention is thus applied to an image capturing apparatus such as a digital still camera, and accordingly the image capturing apparatus can be obtained which is lightweight and can excellently correct aberration such as chromatic aberration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-230830, filed Nov. 30, 2017, which is hereby incorporated by reference herein in its entirety.

What is claimed is:

1. An optical system comprising:
a first lens unit having a positive refractive power, a second lens unit having a positive refractive power, and a third lens unit which are arranged in order from an object side to an image side,
wherein the second lens unit moves in focusing, thereby changing a distance between the first lens unit and the second lens unit and between the second lens unit and the third lens unit,
wherein a focal length of a whole of the second lens unit is positive,
wherein the first lens unit includes a positive lens G1 arranged closest to the object side in the optical system, and
wherein the following conditional expressions are satisfied:

$LD/f<1.00$, $0.15<L/f<0.48$, and $0.02<BF/fG1<0.14$, where LD is a distance on an optical axis between a lens surface of the optical system closest to the object side and an image plane, L is a distance on the optical axis between a lens surface in the second lens unit closest to the object side and the image plane when focusing on an object at infinity, f is a focal length of the optical system, BF is a back focus of the optical system representing a distance from a lens surface of the optical system closest to the image side to the image plane as an air-converted length, and fG1 is a focal length of the positive lens G1.

2. The optical system according to claim 1, wherein the following conditional expression is satisfied:

$0.10<EA2/EA1<0.39$, where EA1 is an effective diameter of a lens surface in the first lens unit closest to the object side, and EA2 is an effective diameter of the lens surface in the second lens unit closest to the object side.

3. The optical system according to claim 1, wherein the following conditional expression is satisfied:

$0.50<f1/f<1.80$, where f1 is a focal length of the first lens unit.

4. The optical system according to claim 1, wherein the following conditional expression is satisfied:

$0.15<f2/f<0.70$, where f2 is a focal length of the second lens unit.

5. The optical system according to claim 1, wherein the following conditional expression is satisfied:

$0.20<fG1/f<5.00$.

6. The optical system according to claim 1, wherein the following conditional expression is satisfied:

$30.0<vdG1$, where vdG1 is an Abbe number of a material of the positive lens G1.

7. The optical system according to claim 1, wherein the second lens unit includes a positive lens and a negative lens.

8. The optical system according to claim 1, wherein the second lens unit is constituted of two lenses.

9. The optical system according to claim 1, wherein in a case where focusing is performed from infinity to a short distance, the first lens unit and the third lens unit are immovable, and the second lens unit moves to the object side.

10. The optical system according to claim 1, wherein the first lens unit includes the positive lens G1, a positive lens G2, a negative lens G3, a positive lens G4, a positive lens G5, and a negative lens G6 in this order from the object side to the image side.

11. The optical system according to claim 1,
wherein the third lens unit includes a positive lens and a negative lens, and
wherein the following conditional expression is satisfied:

$0.80<|fGkp/fGkn|<2.50$, where fGkp is a focal length of a positive lens arranged closest to the image side among every positive lens included in the third lens unit, and fGkn is a focal length of a negative lens arranged closest to the image side among every negative lens included in the third lens unit.

12. The optical system according to claim 1, wherein the third lens unit includes a positive lens Gkp arranged closest to the image side and a negative lens Gkn arranged adjacent to the image side of the positive lens Gkp.

13. The optical system according to claim 1, wherein the third lens unit has a negative refractive power.

14. The optical system according to claim 1, wherein the following conditional expression is satisfied:

$0.17 < D12/LD < 0.40$, where D12 is a distance on the optical axis from a lens surface on the image side of the positive lens G1 to a lens surface on the object side of a lens arranged adjacent to the image side of the positive lens G1.

15. An image capturing apparatus comprising:

an optical system and an image pickup element configured to receive light of an image formed by the optical system, wherein the optical system includes a first lens unit having a positive refractive power, a second lens unit having a positive refractive power, and a third lens unit which are arranged in this order from an object side to an image side, wherein the second lens unit moves in focusing, thereby changing distances a between the first lens unit and the second lens unit and between the second lens unit and the third lens unit, wherein a focal length of a whole of the second lens unit is positive, wherein the first lens unit includes a positive lens G1 arranged closest to the object side in the optical system, and wherein the following conditional expressions are satisfied:

$LD/f < 1.00$, $0.15 < L/f < 0.48$, and $0.02 < BF/fG1 < 0.14$, where LD is a distance on an optical axis between a lens surface of the optical system closest to the object side and an image plane, L is a distance on the optical axis between a lens surface in the second lens unit closest to the object side and the image plane when focusing on an object at infinity, f is a focal length of the optical system, BF is a back focus of the optical system representing a distance from a lens surface of the optical system closest to the image side to the image plane as an air-converted length, and fG1 is a focal length of the positive lens G1.

16. The image capturing apparatus according to claim 15, wherein the following conditional expression is satisfied:

$0.05 BF/IH < 2.20$, where IH is a maximum image height in the image capturing apparatus.

17. An optical system comprising:

a first lens unit having a positive refractive power, a second lens unit having a positive refractive power, and a third lens unit which are arranged in order from an object side to an image side, wherein the second lens unit moves in focusing, thereby changing a distance between the first lens unit and the second lens unit and between the second lens unit and the third lens unit, wherein a focal length of a whole of the second lens unit is positive, wherein the first lens unit includes a positive lens G1 arranged closest to the object side in the optical system, and wherein the following conditional expressions are satisfied:

$0.15 < L/f < 0.48$, and $0.02 < BF/fG1 < 0.14$, where L is a distance on an optical axis between a lens surface in the second lens unit closest to the object side and an image plane when focusing on an object at infinity, f is a focal length of the optical system, BF is a back focus of the optical system representing a distance from a lens surface of the optical system closest to the image side to the image plane as an air-converted length, and fG1 is a focal length of the positive lens G1.

18. The optical system according to claim 17, wherein the following conditional expression is satisfied:

$0.50 < f1/f < 1.80$, where f1 is a focal length of the first lens unit.

19. The optical system according to claim 17, wherein the following conditional expression is satisfied:

$0.15 < f2/f < 0.70$, where f2 is a focal length of the second lens unit.

20. The optical system according to claim 17, wherein the following conditional expression is satisfied:

$30.0 < vdG1$, where vdG1 is an Abbe number of a material of the positive lens G1.

* * * * *